Oct. 20, 1925.
A. GREINER ET AL
1,557,829
VALVE
Filed Feb. 8, 1924
Fig.1.
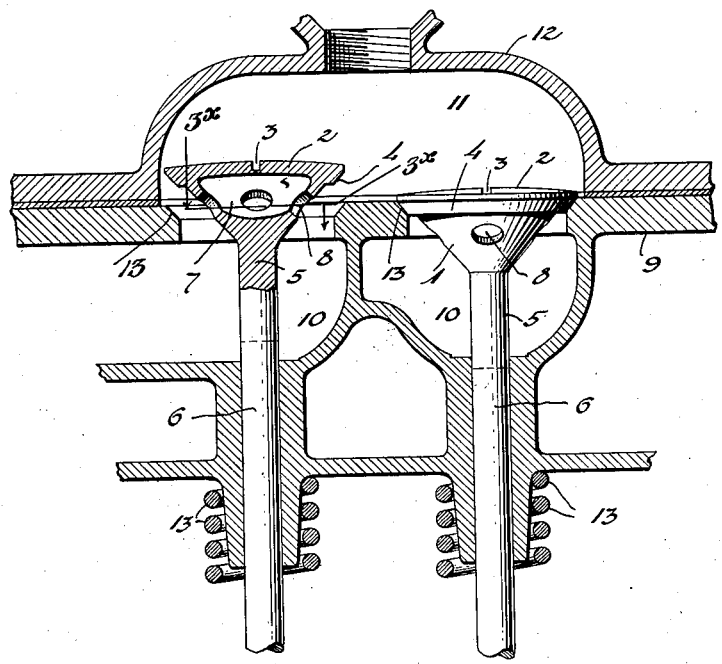
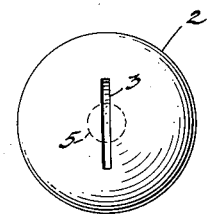
Fig.2.
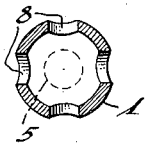
Fig.3.
Inventors:
Adolph Greiner
Cornelius J. Long
By
Attorneys Patented Oct. 20, 1925.

1,557,829

UNITED STATES PATENT OFFICE.

ADOLPH GREINER AND CORNELIUS J. LONG, OF DETROIT, MICHIGAN.

VALVE.

Application filed February 8, 1924. Serial No. 691,359.

*To all whom it may concern:*

Be it known that we, ADOLPH GREINER and CORNELIUS J. LONG, citizens of the United States, residing at Detroit, in the county of Wayne and State of Michigan, have invented certain new and useful Improvements in Valves, of which the following is a specification, reference being had therein to the accompanying drawings.

In our pending application filed June 29, 1922, Ser. No. 571,588, there is disclosed a puppet valve for internal combustion engines, particularly the engines used in connection with automobiles and other vehicles. The valve shown in this pending application is hollow, self adjusting and by reason of its novel construction possesses many advantages compared to a solid valve.

The most important of said advantages is that by our construction a decided reduction in the transmission of heat from the valve head to the stem is obtained and consequent lineal and radial expansion of the said stem is minimized thereby preventing seizing and undue friction in the valve bushing or guide, and also freedom from loss of adjustment between the stem and the tappet of the valve.

The present invention simplifies the construction of our former valve and consequently reduces the expense of manufacture, and the construction will be hereinafter specifically described and then claimed.

Reference will now be had to the drawing wherein—

Figure 1 is a vertical sectional view of a portion of an engine provided with valves in accordance with our invention, one of the valves being closed and the other opened and partly broken away and partly in section;

Fig. 2 is a plan of one of the valves, and

Fig. 3 is a horizontal sectional view of the valve, taken on the line 3$^x$—3$^x$, Figure 1.

Our valve comprises an inverted conical shaped hollow body having a diverging wall 1 with its outer edges integral with a convex head in the form of a disk 2 which has its center portion provided with a kerf or groove 3 to permit of an instrument, as a screw driver, being placed in engagement with the valve head to turn it for seat grinding purposes. The convex head 2 overhangs the diverging wall of the valve body and the annular edge of said head is beveled inwardly from the top of said head towards the wall 1 to provide a seat engaging portion 4.

The wall 1 converges to an integral stem 5 which is comparatively short and is adapted to be connected to a valve rod 6 by a butt weld or other connection which will make the stem 5 as though integral with the rod 6.

The wall 1 cooperates with the head 2 in providing a chamber 7 directly under said head and communicating with said chamber are a series of openings 8 having the axes thereof converge to the axis of the valve body. These openings are of substantial size so that the intermediate portions of the wall 1 are in the form of arms supporting the head 2 in spaced relation to the stem 5.

As showing an installation of our valve, 9 denotes a cylinder block provided with intake and exhaust passages 10 and 10$^a$ communicating with a combustion chamber 11 in a head 12 mounted on the cylinder block. The top of the cylinder block has valve seats 13 for the seat portions 4 of the valves adapted to control the communication between the chamber 11 and either of the passages 10—10$^a$. The valve rods 6 are adapted to be raised by any suitable valve operating mechanism and the valves are adapted to be held normally seated by the expansive force of springs 13, associated with the valve rods 6.

Our valve is preferably cast and then machined, especially in the formation of the seat engaging portion 4 so that this portion of the valve may snugly fit on the seat 13 and shut off the communication between the passages 10 or 10$^a$ and the combustion chamber 11.

We attach considerable importance to the fact that there is no other connection between the valve head 2 and the valve stem 5 than the wall 1, which is comparatively thin and gases entering the inlet passage 7 will be directed against the lower face of the head and absorb heat from the same which is particularly advantageous if the head is exposed to the detonation of fuel in a combustion chamber, as this heat is thereby dissipated in the gases so impinging on the underside of the head and prevented from effecting undue expansion of the valve stem with consequent detrimental results.

At the same time, this absorbing of heat from the valve head effects a preheating of such gases effectively preparing them for ignition when subsequently passed into the combustion chamber 11. Also, due to the fact that the disks 2 of the valve are supported contiguous to their margins and heat radiated from the underside of the central portion of the disk to a constantly changed gaseous body therebeneath, warping of the valve head is minimized.

What we claim is:

1. As a new article of manufacture, a puppet valve for controlling either the intake or the exhaust of an internal combustion engine comprising a hollow one piece head having converging walls terminating in a stem with said walls apertured and constituting the sole connection between said head and stem, the apertures permitting the circulation of intake or exhaust gases through said head, whereby heat from the head is dissipated.

2. A puppet valve comprising diverging walls connected by an integral convex head and a solid axial stem, with said walls apertured to communicate with the chamber in said head, the chamber being unobstructed whereby when the valve is in operation in an engine intake or exhaust gases are interposed between said stem and said head of the valve.

3. A puppet valve comprising an inverted conical hollow body having apertures solely communicating with an unobstructed chamber in said body and providing means whereby heat absorbing gases may pass into said body, a stem integral with said body, and a head integral with said body and overhanging said body to provide seat engaging portions.

4. A puppet valve comprising a rod, and a hollow head on said rod, said head comprising a disk spaced from and free from contact with said rod by orificed tapering walls extending from the marginal portions of said disk to the end of said rod, whereby said rod may be kept cool by interposing gases between said rod and said disk, and said walls cooled by the passage of gases into and out of said hollow head through said orifices.

5. A puppet valve comprising a rod and a hollow head on said rod, said head comprising a disk having a peripheral seat portion, and a plurality of substantially spaced arms branching upwardly and outwardly from the end of said rod to the marginal portion of said disk and forming the sole support for said disk whereby gases may be allowed to circulate around said arms and between said disk and said rod.

In testimony whereof we affix our signatures.

ADOLPH GREINER.
CORNELIUS J. LONG.